United States Patent [19]

Romano

[11] Patent Number: 4,875,502
[45] Date of Patent: Oct. 24, 1989

[54] FLAPPER ACTUATED PILOT VALVE

[75] Inventor: James Romano, Longview, Tex.

[73] Assignee: Con-Tech Industries, Inc., Shreveport, La.

[21] Appl. No.: 255,343

[22] Filed: Oct. 6, 1988

[51] Int. Cl.$^4$ .................. G05D 16/00; F16K 11/04
[52] U.S. Cl. .................. 137/627.5; 137/85; 137/596; 137/488
[58] Field of Search .................. 137/627.5, 596, 625.5, 137/488, 85

[56] References Cited

U.S. PATENT DOCUMENTS 2,752,947  7/1956  Hruska .................. 137/627.5 UX
2,942,623  6/1980  Schwartz .................. 137/627.5

Primary Examiner—Alan Cohan
Attorney, Agent, or Firm—Charles D. Gunter, Jr.

[57] ABSTRACT

A flapper actuated pilot valve is shown is which the output pressure from the valve is dependent upon and proportional to the force exerted by the flapper. The valve includes a valve body with upper and lower chambers and an interconnecting gas passage. A spring-biased poppet in the lower chamber has a primary sealing surface for sealing off the lower chamber and a secondary sealing surface which is contacted by a flapper element located in the upper chamber. The flapper element has an interior bore leading to an exhaust port in the upper end of the flapper element which extends through an opening in the valve body. The flapper element also extends through a central opening provided in a cupped seal in the upper chamber. The cupped seal and primary and secondary sealing areas of the flapper element cooperate to provide and outlet gas pressure which is proportional to the external force supplied by the flapper upon the flapper element.

5 Claims, 1 Drawing Sheet

FLAPPER ACTUATED PILOT VALVE

BACKGROUND OF THE INVENTION

1. Field of the Invention

The present invention relates to pilot valves of the type used to send an output signal pressure to a pneumatically operated process valve for controlling the valve and, specifically, to an improved flapper actuated pilot valve were the output signal pressure is proportional to the force supplied by the flapper.

2. Description of the Prior Art

The oil and gas, chemical and other industries utilize process valves for controlling the flow of process fluids are operated by means of a pneumatic control signal. The pneumatic control for such valves typically includes a pilot valve whose function is to send an output signal pressure to the pneumatic controller, which either opens or closes the process valve.

For instance, in the case of an oil and gas separator tank, a liquid level controller is provided which uses a "float" or displacement type sensor to transmit changes in the liquid level in the tank to a pilot valve outside the vessel. The pilot valve signals a process control or discharge valve in the discharge outlet from the vessel to open or close the discharge valve in response to the liquid level within the vessel. The float within the vessel interior is connected to a "flapper" outside the vessel which, in turn, acts upon the pilot valve.

Supply gas pressure is generally taken from the production gas and routed to the pilot valve. When the liquid level in the vessel is within the desired limit, the supply gas is vented through the pilot valve to the atmosphere. When the liquid level rises sufficiently to change the position of the float, the flapper applies a force to the pilot valve so that supply gas is diverted within the pilot valve to thereby provide a control signal to the discharge valve which allows liquid to flow from the vessel.

U.S. Pat. No. 4,512,365, filed Dec. 8, 1983, entitled "Pilot Valve For An Oil And Gas Separator", assigned to the assignee of the present invention, shows such a pilot valve in which the output control pressure is not dependent upon the force supplied by the flapper to the pilot valve. That is, the pilot valve operates in "on-off" fashion to either emit an output control pressure or to vent the control pressure to the atmosphere. In other types of pneumatically controlled valves, such as those featuring Bourdon tube controllers, it is desirable to provide a pilot valve which outputs a control pressure which is dependent upon the flapper force applied to the pilot valve.

U.S. Pat. No. 4,699,175, filed Oct. 27, 1986, entitled "Flapper Actuated Pilot Valve", also assigned to the assignee of the present invention, was an improvement to the earlier design in providing a flapper actuated pilot valve in which the output control signal emitted by the valve was proportional to the flapper force applied to the valve. The present invention is directed to further improvements in pilot valves of the type which output a control pressure which is dependent upon the flapper force applied to the pilot valve.

SUMMARY OF THE INVENTION

The improved flapper actuated pilot valve of the invention has a valve body with an upper chamber, lower chamber and a gas passage which communicates the lower chamber, by means of a gas passage opening, with the upper chamber. A gas inlet communicates with the lower chamber for supplying control gas pressure to the valve and a gas outlet in the upper chamber allows the flow of control gas pressure from the valve. A poppet is provided having a lower end with a primary sealing surface for contacting the gas passage opening into the lower chamber to seal off the lower chamber from the upper chamber. The poppet has an upper end which extends into the upper chamber and the upper end of the poppet has a secondary sealing surface thereon. A flapper element is provided having a lower portion which is adapted to contact the secondary sealing surface of the poppet and has an upper portion which extends through an opening in the valve body for contacting the flapper. The flapper element has an interior bore which runs from the lower portion thereof to an exhaust port for exhausting control gas pressure from the upper chamber. The secondary sealing surface of the poppet serves to block the escape of control gas pressure when the secondary sealing surface of the poppet contacts the flapper element lower portion.

A coil spring located in the lower chamber normally urges the primary sealing surface of the poppet against the gas passage opening in the absence of an external force applied by the flapper on the flapper element. The flapper element is guided within the upper chamber by a pressure activated cupped seal which seals the upper chamber from the atmosphere. An increase in control gas pressure within the upper chamber acts upon the flapper element and cupped seal to provide a bubble tight seal to the atmosphere. A predetermined pressure buildup within the upper chamber forces the flapper element to extend outwardly from the upper chamber to open the flapper element exhaust port and exhaust control gas pressure to the atmosphere.

The cupped seal and primary and secondary sealing surfaces of the pilot valve cooperate together to provide a pilot valve in which the output signal pressure from the pilot valve is proportional to the force supplied by the flapper upon the flapper element.

Additional objects, features and advantages will be apparent in the written description which follows.

DETAILED DESCRIPTION OF THE INVENTION

Figure 1:
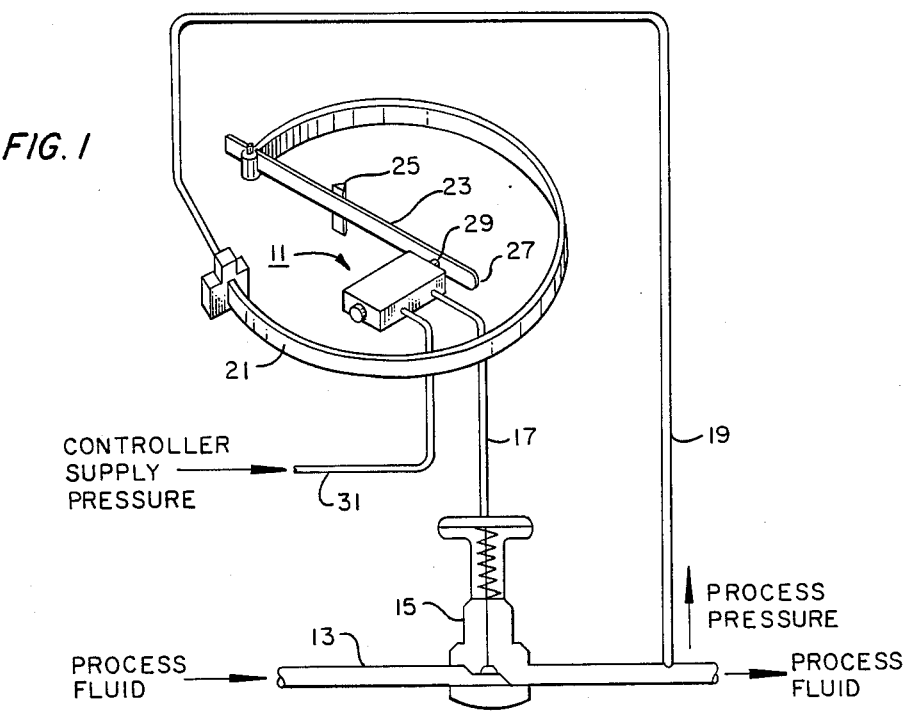
FIG. 1 is a simplified, schematic view of a Bourdon tube controller utilizing a flapper actuated pilot valve of the invention.

FIG. 1 is a simplified, schematic view which shows a flapper actuated pilot valve 11 as it would be used in a Bourdon tube type process controller. The flow of process fluid in the pipe 13 is controlled by means of a process control valve 15. The valve 15 is pneumatically operated by means of a signal pressure in the conduit 17. Such valves are well known and are commercially available. The process pressure is detected and routed through a conduit 19 to one end of a Bourdon tube 21. The tube expands as the pressure increases and bends a flapper 23 around a fulcrum 25 so that the free end 27 contacts a flapper element 29 of the pilot valve 11. As will be explained, the force exerted by the flapper 23 upon the flapper element 29 causes a pressurized control signal which enters the pilot valve 11 through conduit 31 to pass through the conduit 17 to the process control valve 15. The magnitude of the control signal which travels from the pilot valve through conduit 17 is proportional to the force applied to the flapper element 29 by the flapper 23. The control signal in conduit 17 causes the process control valve 15 to open or close in incremental fashion to thereby control the flow of process fluid in the pipe 13.

Figure 2:
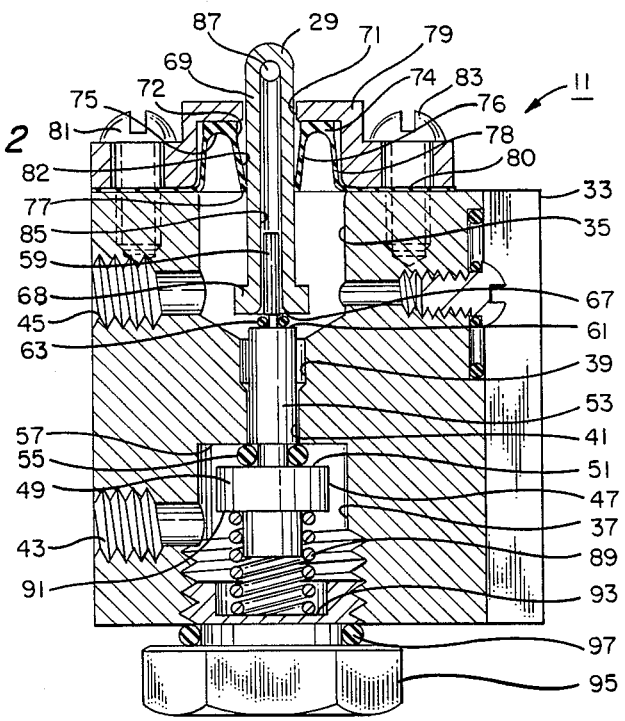
FIG. 2 is a side, cross-sectional view of the flapper actuated pilot valve of the invention.

Turning to FIG. 2, the pilot valve 11 has an upper chamber 35, a lower chamber 37 and a gas passage 39 which communicates the lower chamber, by means of a gas passage opening 41 with the upper chamber 35. A gas inlet 43 communicates with the lower chamber 37 for supplying control gas pressure to the valve 11. A gas outlet 45 is provided in the upper chamber 35 for allowing the flow of control gas pressure from the valve through the conduit 17 (FIG. 1) leading to the process control valve 15.

A poppet 47 has a lower end 49 with a primary sealing surface 51. The primary sealing surface comprises a shoulder formed between the greater relative external diameter of the lower end 49 and the lesser relative external diameter of a mid region 53 of the poppet 47. An O-ring 55 rides upon the shoulder 51 and, in the position shown, contacts the chamber walls 57 of the lower chamber 37. The O-ring 55 thus serves to seal off the lower chamber 37 from the upper chamber 35.

The poppet 47 also has an upper end 59 of lesser relative external diameter than the mid region 53. A shoulder 61 formed between the mid region 53 and the upper end 59 comprises a secondary sealing surface which carries O-ring 63.

A flapper element 29 is provided in the upper chamber 35 having a lower sealing surface 67 which is adapted to contact the O-ring 63 carried upon the secondary sealing surface 61 of the poppet 47. The flapper element 29 also has an upper portion 69 which extends through an opening 71 in the valve body 33 for contacting a flapper, such as flapper 23 in FIG. 1. The flapper element 29 is a one piece, generally cylindrical part which flares outwardly at the lower end to form a flange 68. The outer surface of the flapper element 29 is polished to provide a smooth sealing surface with a low coefficient of friction during the dynamic phases of operation of the pilot valve. As shown in FIG. 2, the flapper element lower sealing surface 67 is chamfered inward 10° to allow for other than perfect 90° contact with the secondary sealing surface provided by O-ring 63.

The flapper element upper portion 69 is received within the central opening 72 of cupped seal 74. The central opening 72 of cupped seal 74 is defined by an inner circumferential wall portion 76 which is joined to an outer circumferential wall portion 78 by an arcuate roof portion 75, cupped seal 74 also includes an outwardly extending, integral gasket portion 80 which surrounds the wall portion 78 in circumferential fashion. The cupped seal 74 is similar in operation to a chevron packing seal in that under pressure it expands to seal around the polished external surface of the flapper element 29 and around the internal surface of coverplate 79. The sealing surface 82 of the cupped seal 74 is molded near but not at the lip 77 of the seal to ensure minimum flash and maximum smoothness and regularity for the sealing surface. The supporting regime of the seal is molded to a maximum thickness of 0.025 inches so as to allow for expansion or ballooning within the restraining areas of the upper chamber 35 and with respect to the flapper element 29. The design of the cupped seal 74 also ensures continuing positive sealing during normal wear. The rubber material is preferably formulated from Buna-N rubber which is compounded to resist oils, chemicals and various other contaminants.

The cupped seal 74 supports the vertical movement of the flapper element 29 but only restricts the movement from complete removal of the valve body 33 as a result of the flange 68 on the bottom of the flapper element. The upper end 59 of the poppet 47 additionally acts as a guide pin to retain the alignment of the flapper element 65 within the valve body 33. The periphery of the integral gasket portion 80 is secured by means of the coverplate 79 and four screws (81, 83 shown) which retain the coverplate 79 on the valve body 33.

The flapper element 29 also has an interior bore 85 which runs from an opening in the lower sealing surface 67 to an exhaust port 87 located on the opposite side of the cupped seal 74 from the opening into the upper chamber 35. The secondary sealing surface 61 of the poppet 47 serves to block the escape of control gas pressure within the upper chamber 35 through the exhaust port 87 when the secondary sealing surface 61 is contacting the opening into the interior bore of the flapper element lower portion 67.

A biasing means, such as coil spring 89, is located within the lower chamber 37 between a shoulder 91 formed upon the poppet 47 and a recess 93 formed in an end cap 95. The spring 89 normally urges the poppet 47 and primary sealing surface 51 against the gas passage opening 41 in the absence of an external force applied by the flapper upon the flapper element 29. The end cap 95 is threadedly engaged within the lower chamber 37 and includes an O-ring seal 97.

As shown in FIG. 2, the poppet upper end 59 is slidably received within the lower extent of the flapper element interior bore 85. The external diameter of the end 59 of poppet 47 is sized to leave annular space between the exterior surface thereof and the surrounding interior bore 85 to allow the flow of control gas pressure from the upper chamber 35 through the exhaust port 87 when the secondary sealing surface 61 moves out of contact with the lower sealing surface 67 of the flapper element 29.

The primary sealing surface O-ring 55 presents a greater relative surface sealing area than the secondary sealing surface O-ring 63. Because of the difference in surface areas, the primary sealing surface 51 will not open until after the secondary sealing surface 61 has closed and the secondary sealing surface 61 will close before the primary sealing surface 51 opens. The control gas pressure present in the upper chamber 35 acts on the surface area of the lower sealing surface 67 of the flapper element 29, tending to force the flapper element out of the upper chamber 35 in the direction of the flapper 23. The flapper element 29 tends to slide through the seal opening 72 but is restricted from excessively exiting the upper chamber 35 by the controller's flapper 23. The cupped seal 74 is simultaneously expanded under pressure in two directions to form a bubble tight seal with respect to the flapper element 29 and with respect to the interior of the upper chamber housing (i.e. coverplate 79).

These principles will be explained in greater detail in the following operational discussion of the pilot valve of the invention. Assume first that a surge in process fluid in pipe 13 causes an increase in the pressure detected in conduit 19 leading to the Bourdon tube 21. As the tube 21 expands, flapper 23 is bent about the fulcrum 25, causing the flapper to apply a force to the flapper element 29. As the force is applied to the flapper element, three actions occur within the valve body in order. First, the flapper element lower sealing surface 67 compresses the O-ring 63 against the shoulder 61, closing off any possible gas flow from the upper chamber through the exhaust port 87. Secondly, the primary sealing surface 51 moves away from the gas passage opening 41, allowing control gas from the inlet 43 to pass to the upper chamber 35, thereby causing a pressure increase in the chamber 35 and gas outlet 45. Thirdly, the increase in control gas pressure in the upper chamber 35 acts against the lower sealing surface 67 of the flapper element 29 tending to move it in an unrestricted direction until it is stopped. The flapper element slides through the central opening 72 of the cupped seal 74 until it is opposed by the controller's flapper 23.

The forces described equalize. When the outlet pressure in the upper chamber 35 increases to the point that the flapper element outward force is greater than the inwardly directed external force exerted by the flapper, the primary sealing surface 51 will again seat against the gas passage opening 41 and close off the gas inlet. After the primary sealing surface has again seated, a further increase within the upper chamber 35 is prevented. An increase in the outlet pressure from the upper chamber 35 can only be achieved at this point by an increase in the external force applied by the flapper 23 upon the flapper element 29 which would begin the cycle again.

As the force applied by the flapper 23 to the flapper element decreases, three actions occur in order. First, the primary sealing surface seats against the gas passage opening 41 and closes off an gas flow from the gas inlet to the upper chamber 35. Secondly, the secondary sealing O-ring 63 moves off the lower sealing surface 67 of the flapper element 29, allowing gas to flow from the upper chamber 35 through the interior bore 85 and exhaust port 87 to the atmosphere. This action decreases the outlet pressure in the upper chamber 35. Thirdly, the pressure decrease in the upper chamber 35 allows the flapper force to overcome the force being applied by the flapper element and tends to move (or push) the flapper element 29 back into the upper chamber 35. Eventually, the flapper element 29 is moved back into the upper chamber 35 until the secondary sealing O-ring 63 is seated in the chamfered seat of the lower sealing surface 67 of the flapper element 29. The 10° chamfer of the flapper element lower sealing surface 67 compensates for irregularities in force vectors acting upon the flapper element and produces a bubble tight seal. A further decrease in the upper chamber pressure can only be achieved by a decrease in the external flapper force which would repeat the cycle.

The primary seal formed by the O-ring 55 cannot be opened until the secondary seal formed by O-ring 63 is closed. This is true because the O-ring 55 has a larger sealing surface than the O-ring 63. The force necessary to break the primary seal 55 is equal to the area of the sealing surface of the O-ring 55 times the difference of the pressures in the outlet and inlet chambers. Similarly, the force required to break the secondary O-ring seal 63 is equal to the seal area of the O-ring 63 times the difference of the outlet and atmospheric pressures. From the relationship of these forces and the fact that the inlet pressure is constant, it can be seen that the force required to open the primary seal and close the secondary seal is dependent upon the respective areas of the sealing surfaces. By making the surface area ratio of the primary O-ring 55 to the secondary O-ring 63 in the range from about 1.5:1 to 5:1, the secondary seal 61 will always close before the primary seal opens.

It can thus be seen that the force which opens and closes the primary and secondary sealing surface is the resultant of the external force applied by the flapper 23 minus the surface area of the lower sealing surface 67 of the flapper element 29. If the flapper element bottom force minus the oppositely directed flapper force results in a positive value, the secondary sealing surface 61 opens and the primary sealing surface 51 closes. If the external force applied by the flapper 23 minus the flapper element bottom force results in a positive value, the primary sealing surface 51 opens and the secondary sealing surface closes.

The flapper element bottom force is equal to the output pressure minus the atmospheric pressure times the lower sealing surface 67 area. The ratio of the change in external flapper force to the change in output pressure is thereby governed by the bore of the upper chamber 35, and hence the pressure responsive area on the flapper element bottom. Although the flapper element lower sealing surface area 67 must exceed the sealing surface area of the primary sealing surface 51, the bore of the chamber 35 can be varied to achieve different ratios between the flapper force and the output pressure. Thus, the output pressure can be made proportional to the flapper force so that a given force results in a given output and doubling that force results in a doubling of the output pressure.

An invention has been provided with several advantages. The flapper actuated pilot valve of the invention is relatively simple in design and reliable in operation. The valve can be inserted in many existing pressure controllers without the necessity of modifying the controller structure. The control gas pressure is only exhausted when the secondary sealing surface is open, thereby resulting in a savings in control gas supplied to the unit. The output of the pilot valve of the invention is dependent upon and proportional to the flapper force, making the valve well suited for use in proportional control environments.

While the invention has been shown in only one of its forms, it is not thus limited but is susceptible to various changes and modifications without departing from the spirit thereof.

I claim:

1. An improved flapper actuated pilot valve, comprising:

a valve body having an upper chamber, a lower chamber, and a gas passage which communicates said lower chamber, by means of a gas passage opening, with said upper chamber;

a gas inlet which communicates with said lower chamber for supplying control gas pressure to said valve and a gas outlet in said upper chamber for allowing the flow of control gas pressure from said valve;

a poppet having a stepped cylindrical shape including a lower end of a greater relative external diameter joined to a mid region of lesser relative external diameter than said lower end, said junction of said lower end and said mid region forming a primary sealing surface for contacting said gas passage opening into said lower chamber to seal off said lower chamber from said upper chamber, said mid region being joined to an upper end of lesser relative external diameter than said mid region, said junction of said mid region and said upper end forming a secondary sealing surface, said primary sealing surface presenting a greater sealing area than said secondary sealing surface, and wherein said upper end of said poppet extends into said upper chamber;

a flapper element having a lower sealing surface adapted to contact the secondary sealing surface of said poppet and having an upper portion which extends through an opening in said valve body for contacting said flapper, said flapper element having an interior bore which runs from said lower sealing surface thereof to an exhaust port for exhausting control gas pressure from said upper chamber, the secondary sealing surface of said poppet serving to block the escape of control gas pressure when said secondary sealing surface contacts said flapper element lower sealing surface;

wherein said flapper element is guided within said upper chamber by a pressure activated cupped seal; and wherein said cupped seal has inner and outer circumferential wall portions which define a central opening for said flapper element, said cupped seal also having an integral gasket portion which extends outwardly in transverse fashion from said outer circumferential wall portion.

2. The improved flapper actuated pilot valve of claim 1, wherein the inner circumferential wall portion of said cupped seal terminates in an internal lip, and wherein said inner circumferential wall portion includes a seal area for sealing against said flapper element, said seal area being molded adjacent to but spaced slightly from said internal lip to improve the sealing properties of said valve.

3. An improved flapper actuated pilot valve, comprising:

a valve body having an upper chamber, a lower chamber, and a gas passage which communicates said lower chamber, by means of a gas passage opening, with said upper chamber;

a gas inlet which communicates with said lower chamber for supplying control gas pressure to said valve and a gas outlet in said upper chamber for allowing the flow of control gas pressure from said valve;

a poppet having a stepped cylindrical shape including a lower end of a greater relative external diameter joined to a cylindrical mid region of lesser relative external diameter than said lower end, said junction of said lower end and said mid region forming a primary sealing surface for contacting said gas passage opening into said lower chamber to seal off said lower chamber from said upper chamber, said cylindrical mid region being joined to a cylindrical upper end of lesser relative external diameter than said mid region, said junction of said mid region and said upper end forming a secondary sealing surface, said primary sealing surface presenting a greater sealing area than said secondary sealing surface, said cylindrical mid region including an o-ring groove at the junction with said lower end, said groove having an o-ring therein, at least a portion of said o-ring extending inwardly within said groove, and wherein said upper end of said poppet extends into said upper chamber;

a flapper element having a lower sealing surface adapted to contact the secondary sealing surface of said poppet and having an upper portion which extends through an opening in said valve body for contacting said flapper, said flapper element having an interior bore which runs from a lower portion thereof to an exhaust port for exhausting control gas pressure from said upper chamber, the secondary sealing surface of said poppet serving to block the escape of control gas pressure when said secondary sealing surface contacts said flapper element lower sealing surface; and a pressure activated cupped seal located within said upper chamber, said cupped seal having inner and outer circumferential wall portions which define a central opening for said flapper element for guiding said flapper element within said upper chamber, said cupped seal also having an integral gasket portion which extends outwardly in transverse fashion from said outer circumferential wall portion.

4. The improved flapper actuated pilot valve of claim 3, wherein the inner circumferential wall portion of said cupped seal terminates in an internal lip, and wherein said inner circumferential wall portion includes a seal area for sealing against said flapper element, said seal area being molded adjacent to but spaced slightly from said internal lip to improve the sealing properties of said valve.

5. The flapper actuated pilot valve of claim 4, wherein said flapper element interior bore forms a cylindrical passage of uniform internal diameter, said uniform diameter being greater than the diameter of said poppet cylindrical upper end, said poppet upper end being received within said flapper element interior bore.

* * * * *